Dec. 22, 1970 J. A. REED 3,550,097
DC MEMORY ARRAY
Filed Aug. 25, 1969
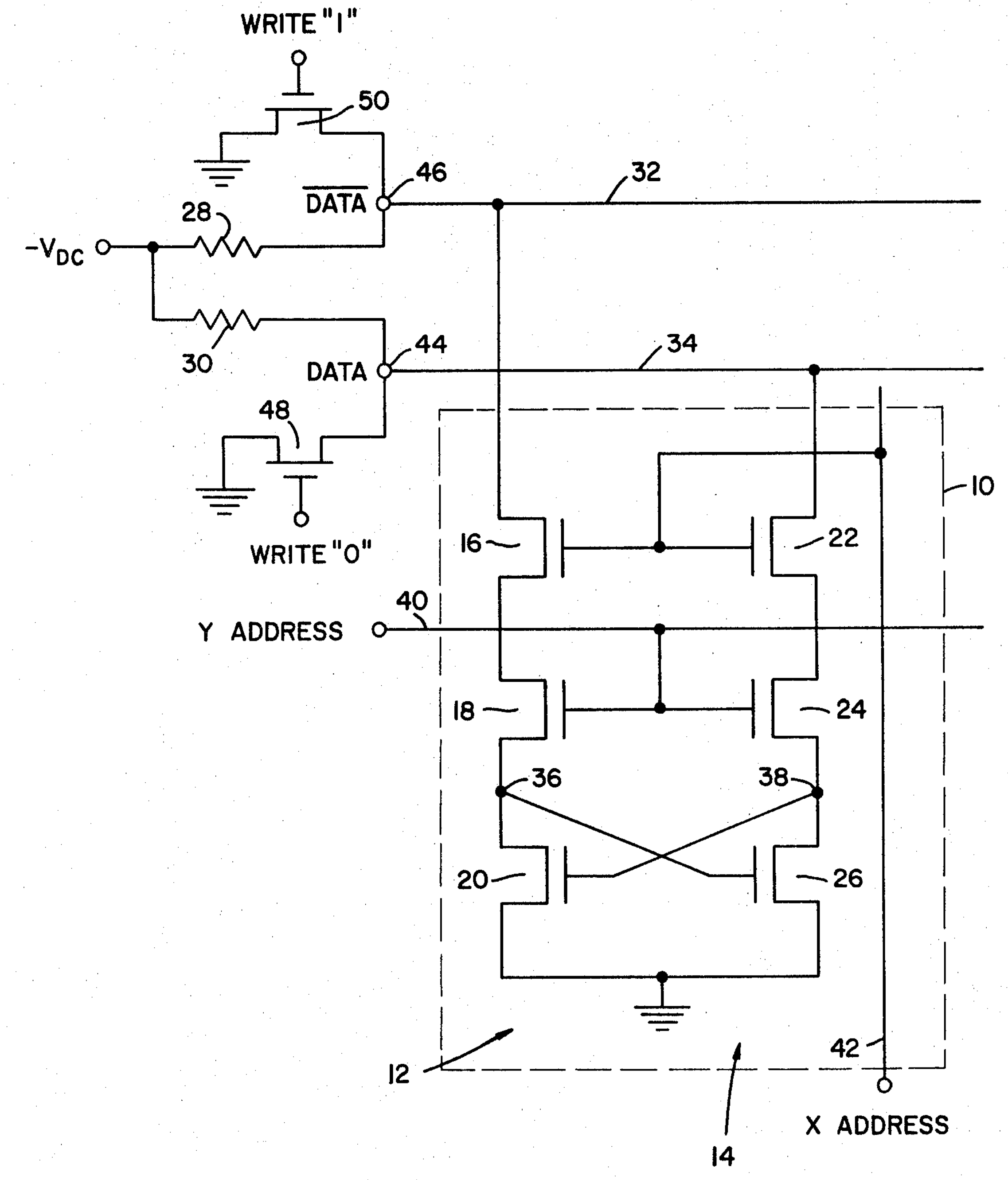
INVENTOR.
JOHN A. REED
BY
Mellin, Moore & Weissenberger
ATTORNEYS United States Patent Office 3,550,097

Patented Dec. 22, 1970

3,550,097
DC MEMORY ARRAY

John A. Reed, Los Altos, Calif., assignor to Shell Oil Company, New York, N.Y., a corporation of Delaware Filed Aug. 25, 1969, Ser. No. 852,657
Int. Cl. G11c *11/40;* H03k *3/286*
U.S. Cl. 340—173 8 Claims

ABSTRACT OF THE DISCLOSURE

The MOSFET memory cells of a random-access array are constituted as flip-flop circuits which normally draw a steady-state DC current. An individual cell can be addressed by blocking current flow in all other cells and determining whether the current drawn by the addressed cell flows in the DATA line or the $\overline{\text{DATA}}$ line.

A writing operation can be accomplished by momentarily driving either the DATA or the $\overline{\text{DATA}}$ line to substrate potential while the desired cell is being addressed.

BACKGROUND OF THE INVENTION

MOSFET (metal oxide silicon field effect transistor) memory cells normally depend on the retention of a capacitive charge on the gate of a MOSFET of the cell, or on a special capacitive element in the cell. Capacitive charges, however, tend to leak off if the cell is not exercised for a substantial number of cycles, and it is therefore necessary to provide for a refresh mode in which all the cells in the memory array are refreshed. During the refresh mode no computation can be carried out, and the refresh mode therefore represents lost time.

SUMMARY OF THE INVENTION

The present invention solves the above-stated problem in a simple manner by constituting the memory cell as a simple cross-coupled flip-flop circuit, in which one of the cross-coupled branches continuously draws current while the other branch does not. The state of the cell is determined by which of the two branches draws current at a given time. In this type of a circuit, the capacitive charges on the memory gates of the cell do not leak off, but are continuously refreshed. Nondestructive reading can be accomplished very simply by addressing the desired cell and determining which of its two branches is drawing current. The capacitive storage properties of the gate electrodes of the cells, memory MOSFET's permit unread cells to maintain their condition while they are disconnected from their power supply during a reading operation. Writing is also accomplished very simply by grounding the power supply of one or the other branch of the cell while it is being addressed.

It is therefore the object of this invention to provide a simple MOSFET memory cell which is continually refreshed, and which dispenses with the necessity of a refresh mode.

It is another object of the invention to provide a MOSFET memory cell constituted as a flip-flop circuit. It is still another object of the invention to provide a MOSFET memory array in which nondestructive reading of a flip-flop memory cell can be accomplished by sensing the voltage drop across the DATA line load resistor due to the current flow of an addressed cell.

BRIEF DESCRIPTION OF THE DRAWINGS

The single figure of the drawing is a circuit diagram of a memory cell constructed in accordance with this invention, and of the common read and write circuitry associated therewith.

DESCRIPTION OF THE PREFERRED EMBODIMENT

Referring now to the drawing, the memory cell of this invention is included within the dotted line array 10. The memory cell 10 will be recognized as a flip-flop circuit consisting of two branches 12 and 14. Branch 12 consists of the X-address gate 16, the Y-address gate 18, and the memory MOSFET 20. Likewise, branch 14 consists of X-address gate 22, Y-address gate 24 and the memory MOSFET 26.

In operation, a steady-state negative voltage is applied to the terminal $-V_{DC}$. This potential is transmitted through load resistor 28, 30 to the $\overline{\text{DATA}}$ line 32 and the DATA line 34 respectively. It will be understood that the $\overline{\text{DATA}}$ line 32 and the DATA line 34 are common to some or all of the cells 10 in a given array.

The impedance of load resistors 28, 30 is sufficiently low so that the $\overline{\text{DATA}}$ line 32 and the DATA 34 are both normally maintained at a substantially negative level even though all the cells in the array are drawing current. Assuming that the cell 10 shown in the drawing is in a logic "1" state, current will flow from the $-V_{DC}$ supply through load resistor 28 and $\overline{\text{DATA}}$ line 32 to branch 12 of the cell 10. In branch 12 of the cell 10, MOSFET's 16, 18 and 20 are connected in series between the $\overline{\text{DATA}}$ line 32 and ground. (For the purposes of this description, the ground symbol denotes the fixed substrate potential of the MOSFET chip.)

The relative "on" resistances of MOSFET's 16, 18 and 20 are so proportioned that when current flows through branch 12, junction 36 is maintained at a potential below the threshold of the gate of memory MOSFET 26 due to the voltage divider action of MOSFET's 16, 18 and 20.

Inasmuch as memory MOSFET 26 is thus cut off, there can be no current flow through branch 14, and junction 38 assumes the negative potential of DATA line 34. This condition of junction 38, of course, maintains the gate of memory MOSFET 20 above threshold and enables memory MOSFET 20 to conduct.

Conversely, the logic "0" state of cell 10 is expressed in a similar manner by current flow through branch 14 but not through branch 12.

It will be noted that the above description presupposes that both the Y-address line 40 and X-address line 42 are energized at all times, so that MOSFET's 16, 18, 22 and 24 can conduct. Indeed, the steady state of the array of this invention is the condition in which all Y-address lines and all X-address lines are energized.

If it is now desired to read a particular cell, such as the cell 10 shown in the drawing, all Y-address lines except line 40 and all X-address lines except line 42 are grounded. This breaks the circuit between $\overline{\text{DATA}}$ line 32 and junction 36, and between DATA 34 and junction 38 in all cells except the addressed cell 10. In this condition, the current flow in the common lines 32 and 34 are determined solely by the condition of the addressed cell 10.

If, as previously assumed, cell 10 is in logic "1" condition, current will flow through $\overline{\text{DATA}}$ line 32 and branch 12 not through DATA line 34 and branch 14. Consequently, a voltage drop will occur across load resistor 28 but not across load resistor 30. As a result, the DATA terminal 44 will remain at $-V_{DC}$, whereas the $\overline{\text{DATA}}$ terminal 46 will drop to a potential nearer ground than that of $-V_{DC}$. This potential difference can be sensed by appropriate readout equipment (not shown), and constitutes the readout signal of the cell 10.

If it is now desired to write a logic "0" into cell 10, write gate 48 is momentarily enabled while the cell 10 is still being addressed. This causes DATA line 34 to go to ground, and since gates 22 and 24 are enabled at this time, junction 38 also drops to ground. As soon as junction 38 goes below the threshold of memory MOSFET 20, current flow in branch 12 ceases. Junction 36 thereupon rises to the negative potential of $\overline{\text{DATA}}$ line 32, and memory MOSFET 26 becomes enabled. When write gate 48 is now blocked, DATA line 34 reverts to its normal negative potential but current will now flow through DATA line 34 and branch 14 instead of $\overline{\text{DATA}}$ line 32 and branch 12. The voltage divider action of MOSFET's 22, 24 26 maintains junction 38 below threshold, and the steady state of the cell is thus again established.

As for the unaddressed cells in the array, their condition has been maintained during the read-write operation on cell 10 by the fact that (e.g., in a cell which is in a logic "1" condition) junction 36 becomes even more grounded through memory MOSFET 20, but junction 38 cannot go to ground due to the blocking of memory MOSFET 26 and is maintained at its negative potential by the capacitive charge on the gate electrode of memory MOSFET 20.

If it is desired to write a "1" on the addressed cell 10, the write pulse is simply applied to write gate 50 instead of write gate 48.

Following a read-write operation on the cell 10, the entire array is returned to its steady-state condition by energizing all the Y-address lines and all the X-address lines of the array.

I claim:

1. A random-access memory array comprising:
   (a) an array of bistable memory cell means having a pair of branches each including a cross-coupled MOSFET memory element, each said branch being connected at one end to one of a pair of common data lines, and at the other end to a point of fixed potential;
   (b) means for establishing a potential difference between said common data lines and said point of fixed potential;
   (c) address means for selectively blocking current flow in both branches of all but an addressed one of said memory cell means; and
   (d) means associated with said common data lines for sensing the presence of current flow in one of said branches of said addressed one of said memory cell means.

2. The memory array of claim 1, in which said address means include a Y-address gate and an X-address gate in each of said branches, said Y-address gate and said X-address gate being in series with one another and with said memory element in each of said branches.

3. The memory array of claim 2 in which the steady state condition of said Y-address gate and said X-address gate in each of said branches is conducting, and addressing is performed by switching the X-address and Y-address gates of all other cells in the array except the addressed cell to a nonconducting state.

4. The memory array of claim 1, in which both of said common data lines are connected through individual load impedance means to a source of potential other than said fixed potential.

5. The array of claim 1, in which means are provided for selectively bringing the potential of a selected one of said common data lines to essentially said fixed potential to perform a write operation.

6. The method of maintaining stored data and performing nondestructive random reading operations on an array of randomly addressable cross-coupled flip-flop memory cells each having a pair of cross-coupled branches connected, respectively, to one of a pair of common data lines, comprising the steps of:
   (a) normally addressing all cells of said array and energizing both said data lines to establish a potential difference across both branches of said cells so as to cause current flow on one of said branches of each cell representative of the logic state of said cell;
   (b) individually addressing a selected cell by blocking current flow through both branches of all other cells; and
   (c) sensing the identity of the data line through which current continues to flow to provide a readout of the logic state of said selected cell.

7. The method of claim 6, in which writing operations are performed by the additional step of removing said potential difference across a selected one of said branches of said selected cell while said cell is individually addressed.

8. The method of claim 7, in which said potential difference is removed by essentially deenergizing a selected one of said common data lines.

References Cited

UNITED STATES PATENTS

| | | | |
|---|---|---|---|
| 3,390,382 | 6/1968 | Igarashi | 340—173 |
| 3,447,137 | 5/1969 | Fever | 340—173 |

OTHER REFERENCES

Gardner et al.: "Storage Cell," IBM Technical Disclosure Bulletin, vol. 9, No. 6, November 1966, pp. 702–703.

Brewer: "Suitcase-size Memory for Longer Space Trips," Electronics, Nov. 13, 1967, pp. 138–140.

Agusta et al.: "Single 3-Dimensional Memory Cell," IBM Technical Disclosure Bulletin, vol. 8, No. 12, May 1966, p. 1851.

TERRELL W. FEARS, Primary Examiner

U.S. Cl. X.R.

307—238, 279